(12) United States Patent
Ranson

(10) Patent No.: US 8,307,715 B2
(45) Date of Patent: Nov. 13, 2012

(54) DIRECTLY APPLIED READ AND TRANSMIT—DIGITAL STRAIN ENCODER AND DIGITAL LOAD CELL

(75) Inventor: William Ranson, Columbia, SC (US)

(73) Assignee: Direct Measurments, Inc., Atlanta, GA (US)

( * ) Notice: Subject to any disclaimer, the term of this patent is extended or adjusted under 35 U.S.C. 154(b) by 407 days.

(21) Appl. No.: 12/738,386

(22) PCT Filed: Mar. 23, 2010

(86) PCT No.: PCT/US2010/028249
§ 371 (c)(1),
(2), (4) Date: Apr. 16, 2010

(87) PCT Pub. No.: WO2010/111230
PCT Pub. Date: Sep. 30, 2010

(65) Prior Publication Data
US 2011/0184664 A1    Jul. 28, 2011

Related U.S. Application Data

(60) Provisional application No. 61/162,916, filed on Mar. 24, 2009.

(51) Int. Cl.
*G01B 5/30* (2006.01)
*G01B 7/16* (2006.01)

(52) U.S. Cl. .......................................... 73/760; 73/777

(58) Field of Classification Search .................... 73/760, 73/777, 862.627
See application file for complete search history.

(56) References Cited

U.S. PATENT DOCUMENTS

| | | | |
|---|---|---|---|
| 5,007,042 A * | 4/1991 | Santi | 370/212 |
| 6,408,698 B1 * | 6/2002 | Brereton et al. | 73/841 |
| 6,934,013 B2 | 8/2005 | Vachon et al. | |
| 7,177,505 B2 * | 2/2007 | Willcox | 385/52 |
| 7,477,995 B2 | 1/2009 | Hovis et al. | |
| 7,591,187 B2 | 9/2009 | Hamel | |
| 8,055,814 B2 * | 11/2011 | Sichner et al. | 710/38 |
| 8,082,822 B2 * | 12/2011 | Hoenke | 81/57.14 |
| 2006/0254365 A1 | 11/2006 | Hamel | |

FOREIGN PATENT DOCUMENTS
WO    2008/021387 A2    2/2008

\* cited by examiner

*Primary Examiner* — Max Noori
(74) *Attorney, Agent, or Firm* — Jacobson Holman PLLC

(57) ABSTRACT

A digital strain encoder includes a gage-emitter, a sensor-receiver, a transmitter, and an energy source. The gage-emitter is affixable to a surface to be measured and deformable on a one-to-one basis with the surface, and emits a reference strain signal in the absence of strain and an altered strain signal when the surface is subjected to strain and the gage-emitter is deformed. The gage-emitter also emits a unique reference identification signal. The sensor-receiver floats over the gage-emitter so as not to deform with the surface, and detects the reference and altered strain signals and the identification signal emitted by the gage-emitter. The transmitter is coupled to the sensor-receiver for transmitting the detected reference and altered strain signals to a remote receiver.

14 Claims, 9 Drawing Sheets

FREQUENCY MAX AT BASELINE

FREQUENCY MAX AFTER

FIG. 10A
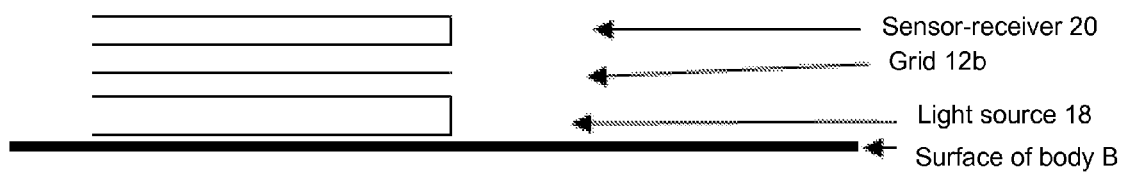
FIG. 10B
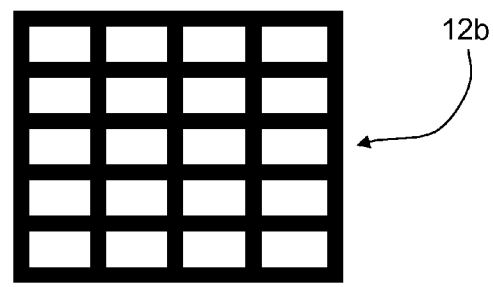
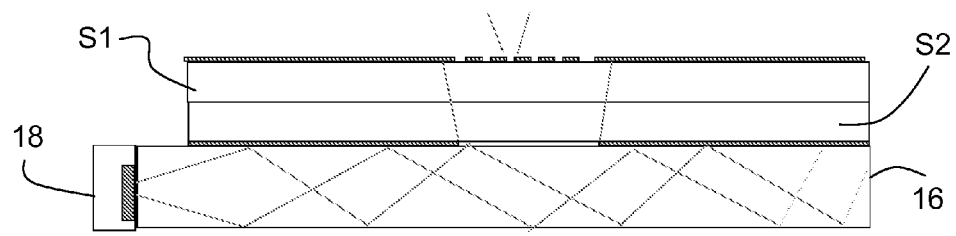
FIG 10C

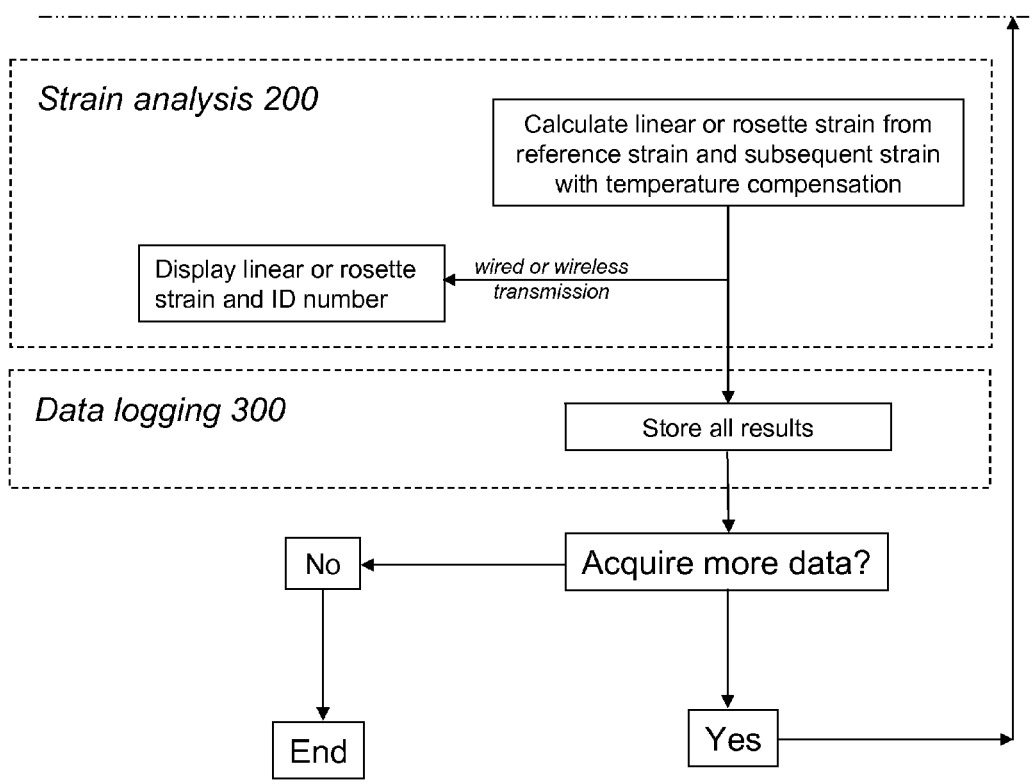

DIRECTLY APPLIED READ AND TRANSMIT—DIGITAL STRAIN ENCODER AND DIGITAL LOAD CELL

CROSS-REFERENCE TO RELATED APPLICATIONS

The present patent application is a nationalization of International application No, PCT/US2010/028249, filed Mar. 23, 2010, published in English, which is based on, and claims priority from, U.S. provisional Application No. 61/162,916, filed Mar. 24, 2009, both of which are incorporated herein by reference in their entireties.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

The invention is directed to a device to measure strain wirelessly, referred to hereinafter as a "directly applied read and transmit-digital strain encoder" (DART-DSE).

2. Description of Related Art Including Information Disclosed under 37 CFR §§1.97 and 37 CFR 1.98

In the prior art as shown in FIG. 8, the sensor gage is a single, long, continuous circuit of thin foil. Strain is inferred from the change in electrical resistance over the entire length of the foil circuit. The strain field in the vicinity of the crack affects only a small fraction of the total sensing length. This indication is "averaged" with the remaining unaffected length, thereby degrading the signal near small strain fields created by precursors to structural problems.

The prior art sensor gage of FIG. 8:
Lacks sensitivity needed for structural health monitoring ("SHM")
Must be thermally matched with the material of the underlying body
Can experience electrical drift on certain engineered materials (e.g. composites)

It is to the solution of these and other problems that the present invention is directed.

BRIEF SUMMARY OF THE INVENTION

It is accordingly a primary object of the present invention to provide a digital strain encoder that measures strain directly.

It is another object of the present invention to provide a digital strain encoder that provides the sensitivity needed for SHM.

It is still another object of the present invention to provide a digital strain encoder that requires no thermal matching to the material of the underlying body.

It is still another object of the present invention to provide a digital strain encoder that works on any material to which the DSE can be bonded.

It is still another object of the present invention to provide a digital strain encoder that indicates through paint and other stable coatings.

These and other objects are achieved by provision of a digital strain encoder that includes a gage-emitter, a sensor-receiver, a transmitter, a temperature sensor, and an energy source. The gage-emitter is affixable to a surface to be measured and deformable on a one-to-one basis with the surface, and emits a reference strain signal in the absence of strain and an altered strain signal when the surface is subjected to strain and the gage-emitter is deformed. The gage-emitter also emits a unique reference identification signal. The sensor-receiver floats over the gage-emitter so as not to deform with the surface, and detects the reference and altered strain signals and the identification signal emitted by the gage-emitter. The transmitter is coupled to the sensor-receiver for transmitting the detected reference and altered strain signals to a remote receiver.

The gage-emitter comprises a plurality of strain gage elements, which emit the reference and altered strain signals, and a plurality of serialization elements, which emit the unique identification signal.

The sensor-receiver comprises two sets of sensor elements. The first set of sensor elements, referred to hereinafter as the strain sensor elements 22, receive the strain signal associated with strain measurement, and are selected to be compatible with the signal emitted by the strain gage elements. The second set of sensor elements, referred to hereinafter as the serialization sensor elements, receive the serialization signal associated with the unique ID, and are selected to be compatible with the detectable physical quantity emitted by the serialization elements.

Other objects, features, and advantages of the present invention will be apparent to those skilled in the art upon a reading of this specification including the accompanying drawings.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which:

FIG. 1b is a diagrammatic plan view of the gage-emitter of the gage and sensor assembly of FIG. 1a.

FIG. 1c is a diagrammatic plan view of the sensor-receiver of the gage and sensor assembly of FIG. 1a.

FIG. 10A is a diagrammatic view of the arrangement of the components in a DSE in accordance with the present invention, in which the strain gage elements of the gage-emitter define a matrix.

FIG. 10B is a top plan view of the grid of FIG. 10A.

FIG. 10C is a diagrammatic view showing the illumination of the grid of the DSE of FIG. 10A.

FIGS. 11A and 11B together are a high level flow diagram illustrating the algorithm followed by the computer program in accordance with the present invention.

DETAILED DESCRIPTION OF THE INVENTION

Figure 1A:
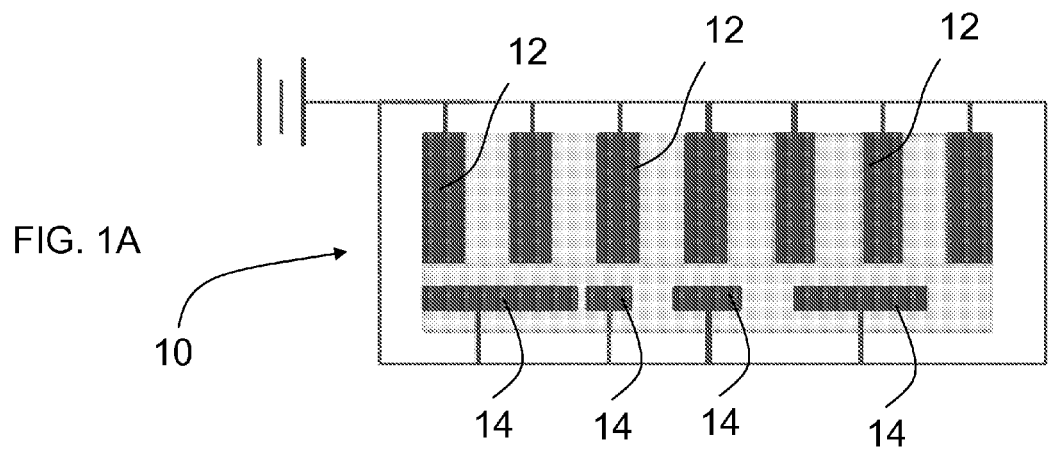
FIG. 1a is a diagrammatic plan view of an assembled gage-emitter and sensor-receiver of a DSE in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

A typical personal computer or workstation a user might log on with would include typical components such as a bus for communicating information, and a processor coupled with the bus for processing information, random access memory, coupled to the bus for storing information and instructions to be executed by the processor. Random Access Memory also may be used for storing temporary variables or other intermediate information during execution of instructions by the processor, a read only memory coupled to the bus for storing static information and instructions for the processor, and a data storage device coupled to the bus for storing information and instructions. The data storage device may include a magnetic disk or optical disk and its corresponding disk drive can be coupled to the computer system. Also the system may be coupled via the bus to a display device, such as an LCD monitor, for displaying information to a computer user. The computer system further includes a keyboard and a cursor control, such as a mouse. Any other access devices for accessing a network are intended to be included in the invention. Such devices may include properly equipped and configured cellular phones and personal digital assistants.

The following definitions are used herein:

Signal: any time-varying or spatial-varying quantity

The invention is directed to a DART-DSE, which as shown in FIGS. 1A-1C and FIG. 2 includes a gage-emitter 10, a sensor-receiver 20, a local transmitter 30 (which can be wireless or wired), a temperature sensor 40, a self-contained power source 50, and a local microprocessor 60. The DSE can also include a housing 70 for the gage-emitter 10, the sensor-receiver 20, the local transmitter 30, the self-contained power source 50, and the local microprocessor 60. The temperature sensor 40 senses the temperature of the surface of the body B, and is therefore affixed to the outside of the housing 70.

At least a portion of one wall of the housing 70 is affixed to the surface of a body B. The gage-emitter 10 is affixed to the housing wall that is affixed to the surface of the body B, so that the gage-emitter 10 deforms on a one-to-one basis with the surface, while the sensor-receiver 20 floats over the gage-emitter 10. The power source 50 provides power to the sensor-receiver 20, the transmitter, and the local microprocessor 60; and also provides power to the gage-emitter 10 and the temperature sensor 40 if required, as discussed in greater detail hereinafter. The gage-emitter 10 (FIGS. 1A and 2), sensor-receiver (FIGS. 1B and 3), transmitter (FIG. 3), and power source 50 are a few mils thick or thicker if necessary. The microprocessor 60 may be thicker than the assembled gage-emitter 10 and sensor-receiver 20.

Figure 4:
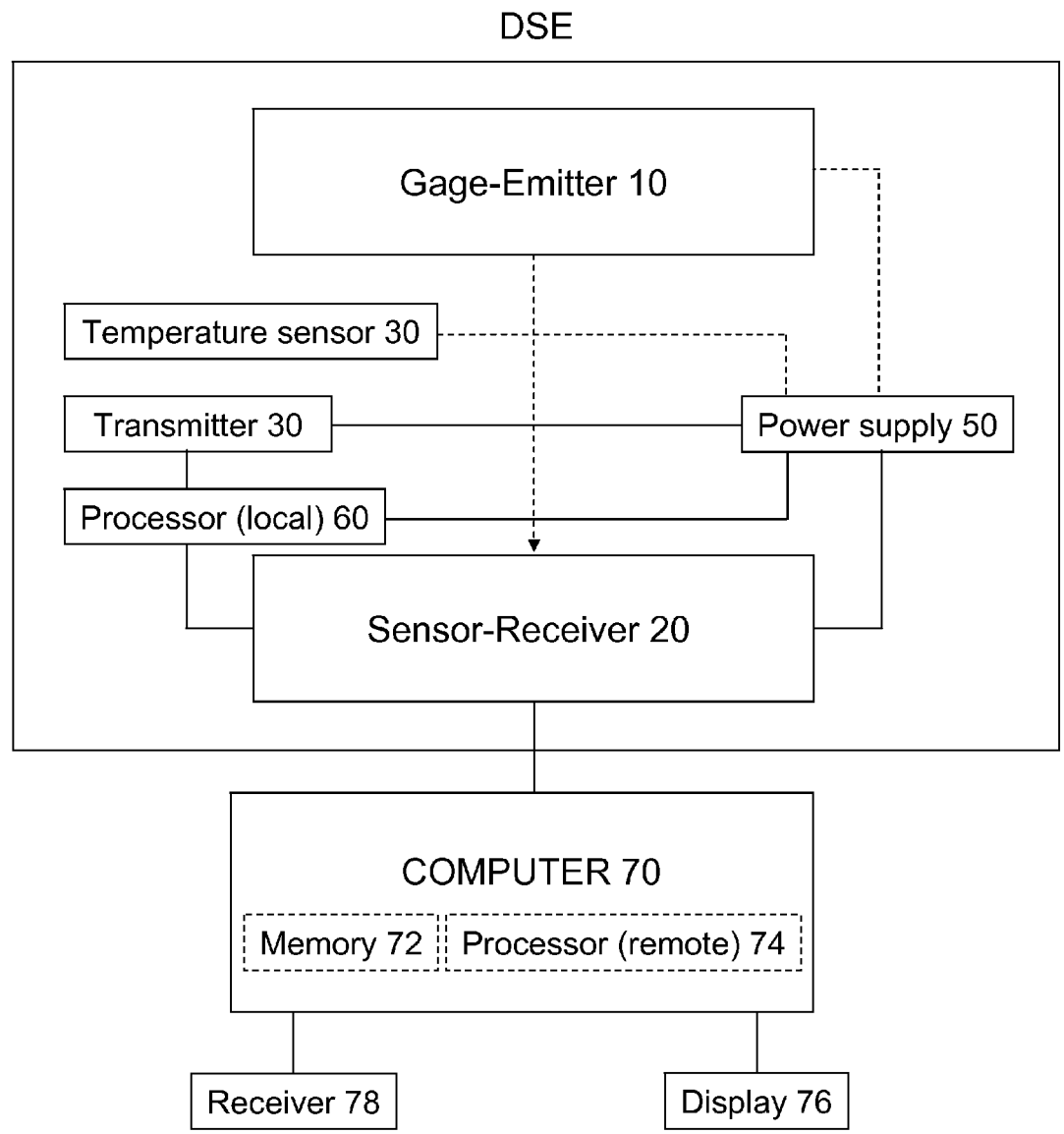
FIG. 4 is a schematic view of the DSE and an associated computer in accordance with the present invention.

As also described in greater detail hereinafter, the DSE is used in conjunction with a computer 70 remote from the DSE, which as shown in FIG. 4, conventionally comprises a memory 72 for storing programs and data and a processor 74 (referred to herein as the "remote processor" as distinct from the local microprocessor 60 included in the DSE) for implementing the programs and processing the data, and is associated with a display 76 for displaying data. A receiver 78 in communication with the computer 70 receives signals from the wireless transmitter of the DSE.

Figure 2:
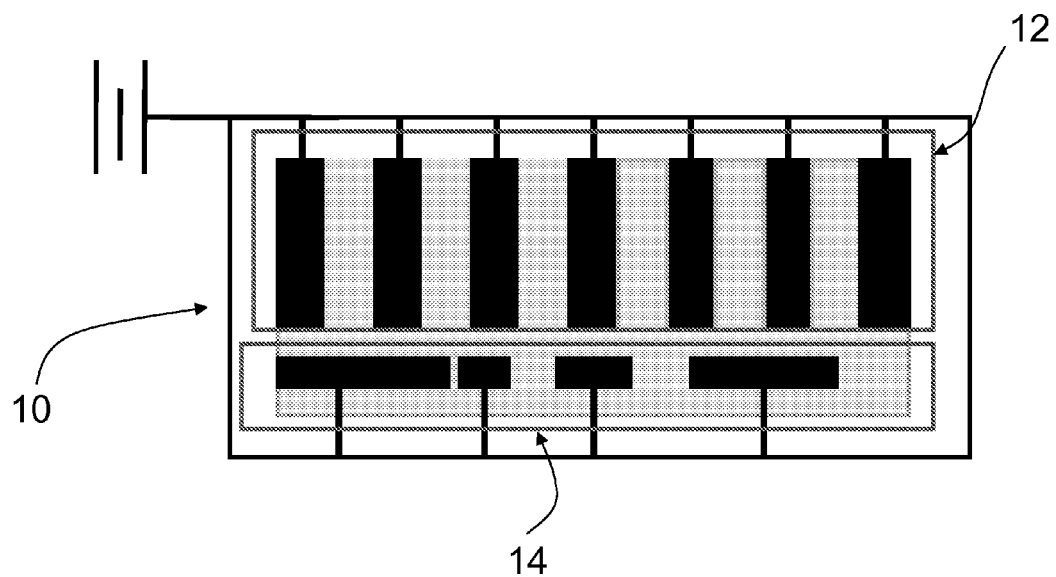
FIG. 2 is an enlarged view of the gage-emitter of FIG. 1c, showing in greater detail the strain emitting elements and the serialization emitting encoded elements.

Referring to FIGS. 1A and 2, the gage-emitter 10 comprises two parts, (1) a plurality of strain gage elements 12, and (2) a plurality of serialization elements 14. In the embodiment shown in FIGS. 1A and 2, the strain gage elements 12 are equally spaced, side-by-side bars and the serialization elements 14 are end-to-end, unequally spaced bars. The lengths of the serialization elements 14 and the spacing between them encode a number from 0 to 4 billion to provide a unique identification number for each gage-emitter 10.

The gage-emitter 10 is active in that the strain gage elements 12 and the serialization elements 14 can naturally emit a signal, can emit a signal upon external stimulation, or reflect a signal. The signal can be a naturally emitted detectable physical quantity (as, for example, a material that naturally emits a magnetic field or radioactivity), a detectable physical quantity emitted upon external stimulation (as, for example, a material that creates a magnetic field when subjected to a current or a material that emits light when stimulated by an electric field), or a reflected detectable physical quantity; and the signal can be in any bandwidth of the electromagnetic spectrum (including the audio frequency range), or it can be a field such as a magnetic field. The signal emitted by the strain gage elements 12 is referred to herein as the "strain signal" and the signal emitted by the serialization elements 14 is referred to herein as the "serialization signal."

The gage-emitter 10 deforms on a one-to-one basis with the deformation of the surface to which it is affixed. Deformation of the gage-emitter 10 alters the signals emitted by the strain gage elements 12 and the serialization elements 14.

The gage-emitter 10 requires a power source 50 when the strain gage elements 12 and the serialization elements 14 emit signals in the electromagnetic spectrum; but do not require a power source 50 when they naturally emit or reflect a detectable physical quantity (for example, when they are made of naturally magnetic or radioactive materials).

Figure 1B:
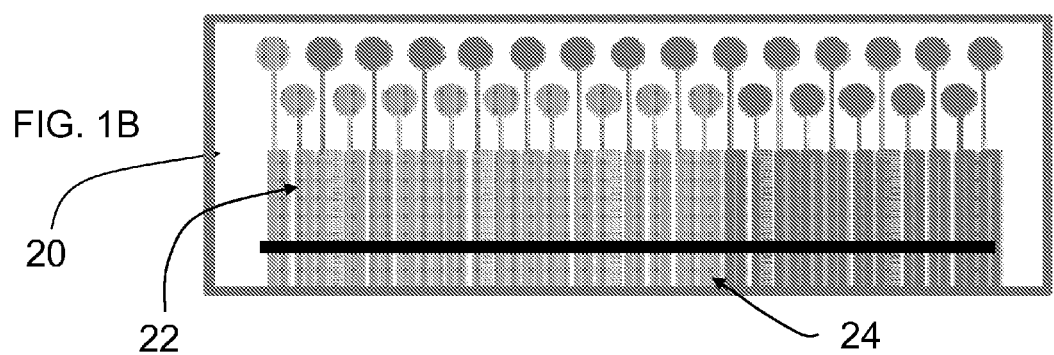
Figure 1C:
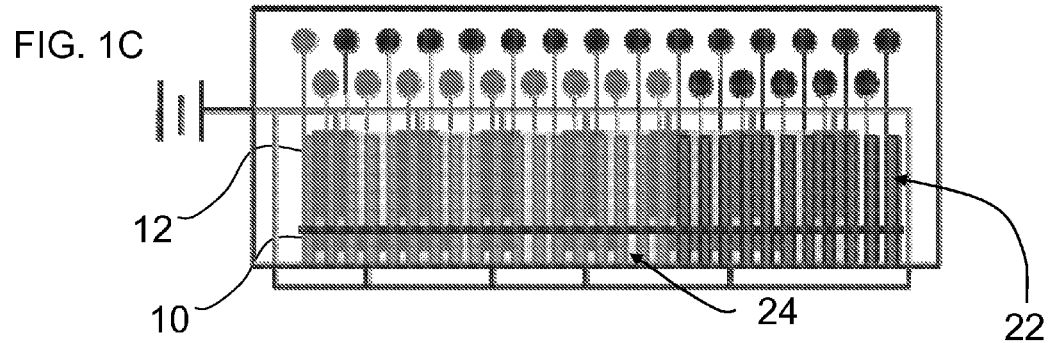

As shown in FIG. 1B, the sensor-receiver 20 comprises two sets of sensor elements. The first set of sensor elements, referred to hereinafter as the strain sensor elements 22, receive the strain signal associated with strain measurement, and are selected to be compatible with the signal emitted by the strain gage elements 12. The second set of sensor elements, referred to hereinafter as the serialization sensor elements 24, receive the serialization signal associated with the unique ID, and are selected to be compatible with the signal emitted by the serialization elements 14. As illustrated in FIGS. 1B and 1C, each strain sensor element 22 is paired with a serialization sensor element 24, with the paired strain sensor element 22 and serialization sensor element 24 formed as end-to-end bars, the bars being arranged side-by-side such that the strain sensor elements 22 overlie the strain gage elements 12 and the serialization sensor elements 24 overlie the serialization elements 14.

Using the strain and the serialization sensors, the sensor-receiver 20 acquires the signals emitted by the strain gage elements 12 and the serialization elements 14, respectively. The signals acquired by the sensor-receiver 20 are then transmitted to the local microprocessor 60.

The local microprocessor 60 can be configured with sufficient capacity to implement a program or programs necessary to analyze the signals received from the strain sensors and calculate strain, and can then transmit the calculation via the local transmitter 30 to a display device 76 for display to a user, and/or to the remote computer 70 to be stored. Alternatively, the local microprocessor 60 can be configured with a more limited capacity to preprocess the signals to the extent permitted by its capacity, and can then transmit the preprocessed signals via the local transmitter 30 to the remote computer 70 for final processing and display and storage. The calculating capacity and storage capacity of the local microprocessor 60 determine what is calculated by and what is stored therein.

Figure 3:
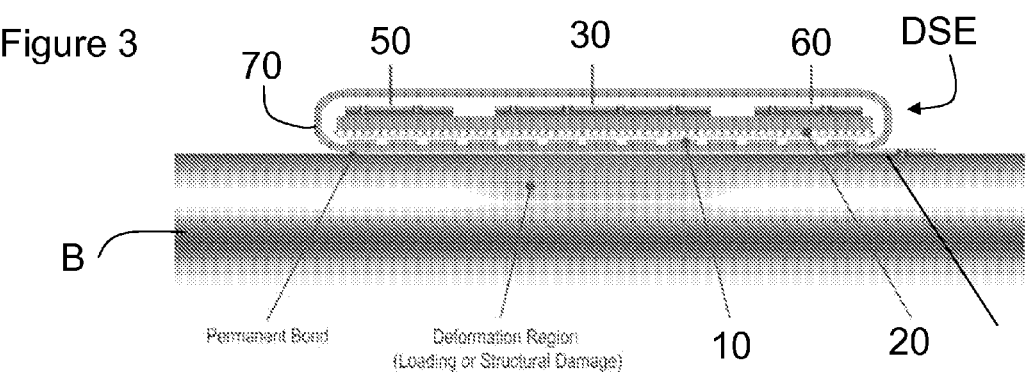
FIG. 3 is a side view, partially in cross-section, of a DSE in place on an object under study.

Referring to FIGS. 3 and 4, the sensor-receiver 20 is coupled to the microprocessor 60. The local transmitter 30 can be integral with or separate from the microprocessor 60, and transmits the signal (and any changes in the signal as the surface is subjected to a force) to a remote receiver 78. The data received by the remote receiver 78 is stored in a data base. If the local processor is used to perform the correlation between the signal from the gage-emitter 10 and strain, the correlation data is also transmitted to the remote receiver 78 and stored in the database, which records emitted signals and correlated strains. Whether the data is processed at the local microprocessor 70 or the remote processor 74, it is preferable to store both the raw and the processed in the data base for later additional processing (of the raw data) or post-processing (of the processed data).

Figure 5A:
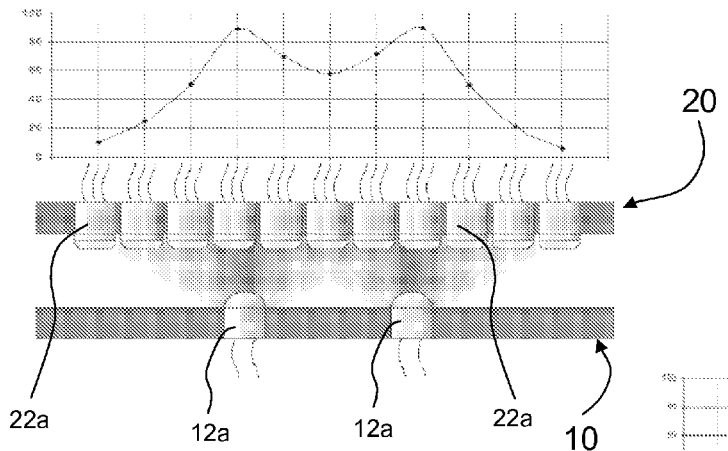
FIGS. 5A-5C are diagrammatic side views of a second embodiment of a DSE in accordance with the present invention, in which light emitting diodes are used as the emitters in the gage-emitter and photodiodes are used as the sensors in the sensor-receiver.
Figure 5B:
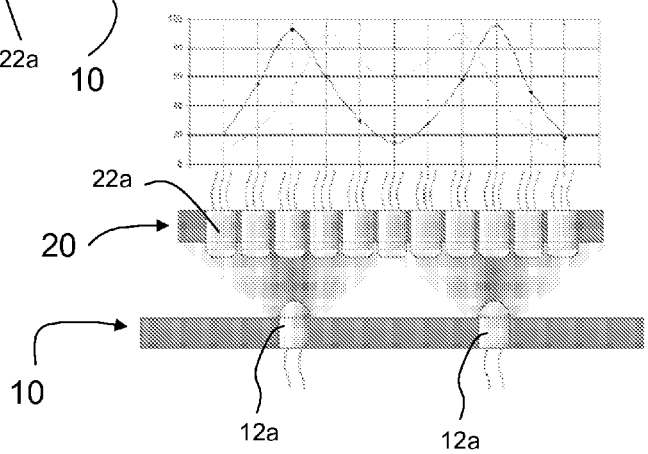
Figure 6:
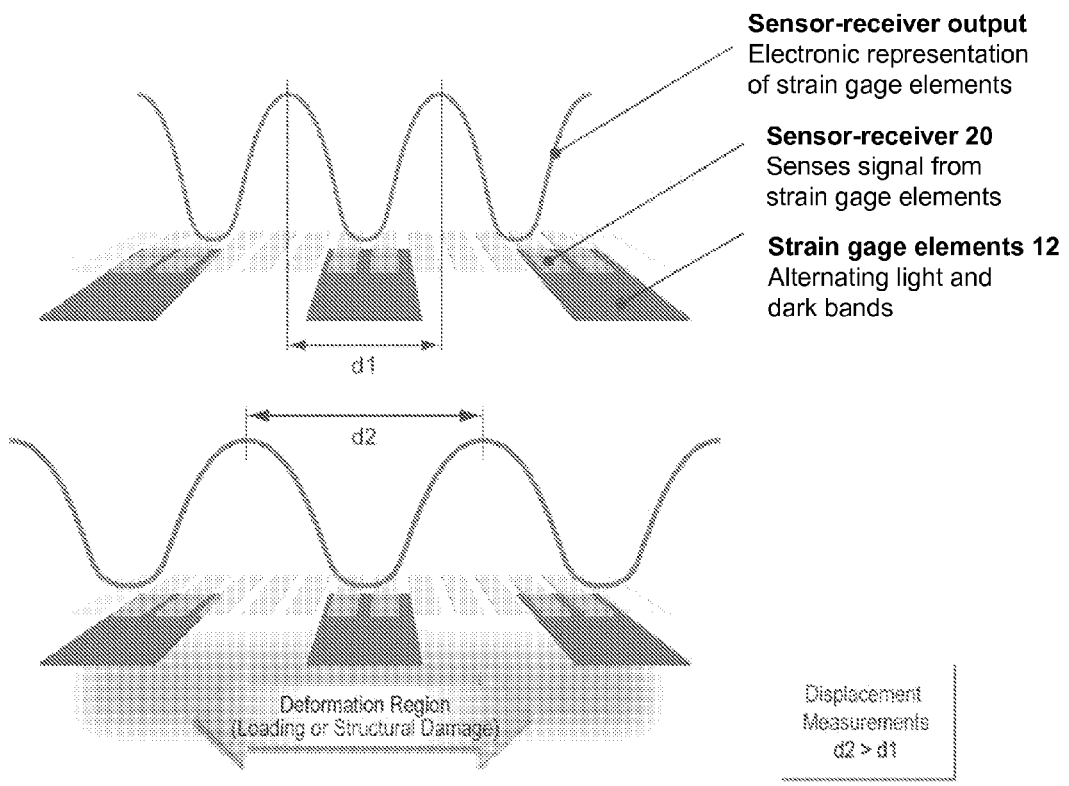
FIG. 6 is a diagram illustrating the representation of data as a sine wave.
Figure 7:
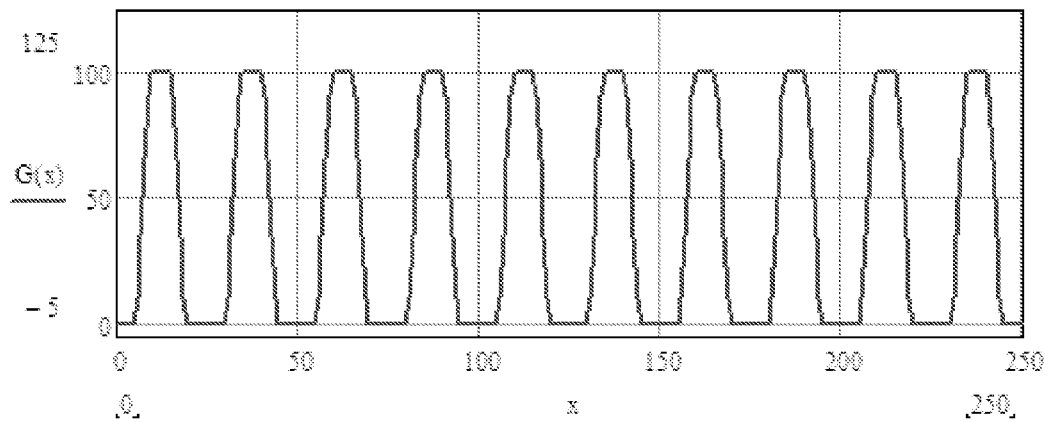
FIG. 7 is a diagram illustrating the representation of data as a square wave.
Figure 8:
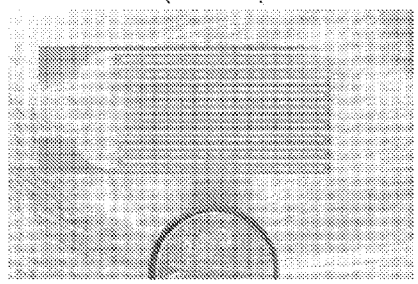
FIG. 8 is a top plan view of a prior art electrical resistance gage.

The stored data contains both baseline data (shown in FIG. 5A), which is recorded when the object to be measured is an undeformed state and which is used as a reference, and strain data (shown in FIG. 5B). The data can be represented as a sine wave (as shown in FIG. 6), or as a square wave (as shown in FIG. 7. When the object is strained, the gage-emitter 10 is also strained and the sine wave or square wave signals are changed (the change in the sine wave is illustrated in the bottom part of FIG. 6). Frequency or spatial changes in the sine wave or the square wave are used to determine the strains. The deformed object stretches the sine or square wave, and the peaks (or valleys) are separated by the changes in distances d1 and d2, which are used to calculate strains. When the changes are uniform, the data represents uniform strains or loads. When the changes are non-uniform, then the data is used to determine crack opening as in the case of fatigue cracks.

The power source 50 (shown in FIG. 3) can be affixed to the sensor-receiver 20 or to the housing 70. If the transmitter is separate from the local microprocessor 60, it can be overlayed on the gage and sensor assembly. The power source 50 can be implemented in a number of ways, including as a thin film lithium battery, which can be part of the transmitter, the gage and sensor assembly, or as a piezoelectric or other energy harvester.

The temperature sensor 40 can be implemented as, for example, a thermocouple or as a thermistor. It will be appreciated that a thermocouple does not require connection to the power source 50, but that a thermistor will require such a connection.

Figure 5C:
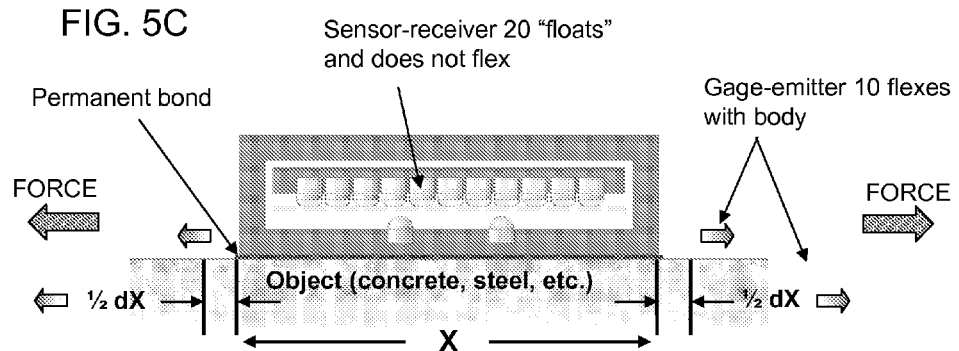

FIGS. 5A-5C depict an embodiment of the DSE, in which light emitting diodes 12a are used as the gage elements in the gage-emitter 10 and photodiodes 22a as the sensors in the sensor-receiver 20. It is also possible to use a CMOS image sensor when LEDs or other light emitters are used as the gage elements. The LEDs emit a signal in the visible or infrared range of the electromagnetic spectrum. The LEDs are embedded in a flexible material and fixed to the surface of a body B, so that the gage-emitter 10 deforms on a one-to-one basis with the surface. In the embodiment illustrated in FIG. 5C, the surface deforms by dX and the emitted signal exhibits a frequency shift associated with this deformation. The emitted signal is received by the sensors, which float over the LEDs emitters, and which are in communication with both the local processor and the wireless transmitter. The wireless transmitter transmits the signal wirelessly to a remote processor 74 for storage in a data base. The change in the emitted signal is correlated by one or both of the local microprocessor 60 and remote processor 74 to the deformation of the component.

Referring to FIGS. 5A and 5B, the energized sensor-receiver 20 is started at a reference state and the local processor stores the reference frequency for strain measurement and the frequency associated with the unique ID for the DSE. This reference strain frequency and ID frequency are displayed in real time on a display device 76 and stored in the data base. As the body B to which the gage-emitter 10 is affixed exhibits a change in strain due to loading the body B, the frequency is recorded by the local processor for the unique gage-emitter 10 and the change in frequency from the reference frequency is analyzed by the local microprocessor 60 and/or the remote processor 74 to define a strain rosette (as described in U.S. Pat. No. 6,934,013, which is incorporated herein by reference in its entirety) or linear strain as described in (as described in U.S. Pat. No. 7,477,995, which is incorporated herein by reference in its entirety) and the data are stored in the data base. The stored data are used to calculate strain as described in U.S. Pat. Nos. 6,934,013 and 7,477,995. The strain data are stored to a data log. The data log is queried to yield strain and with a post processor yields load. This process can be completed for a number of specified cycles or some other condition such as a strain rate or load rate.

Figure 9A:
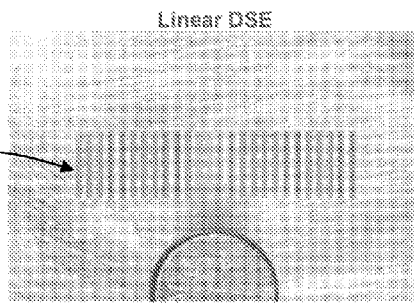
FIGS. 9A and 9B are top plan views of linear and circular DSEs, respectively, in accordance with the present invention.
Figure 9B:
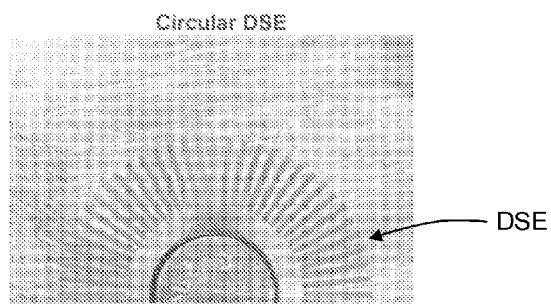

FIGS. 9A and 9B illustrate linear and circular configurations of the DSE.

The linear DSE as shown in FIG. 9A is made-up of multiple independent strain gage elements 12. Strain is sensed directly by measuring the relative displacement of the strain gage elements 12. The strain field in the vicinity of the crack is detected on several sensing elements, and unaffected elements have no bearing on the strain reading. The linear DSE of FIG. 9A:

Measures strain directly

Provides sensitivity needed for SHM

Requires no thermal matching to the material of the underlying body

Works on any material to which the DSE can be bonded

Indicates through paint and other stable coatings

The circular DSE as shown in FIG. 9B is the same as the linear DSE shown in FIG. 9B, but detects anomalies and SHM precursors around the circumference of stress concentration areas, regardless of direction.

The DSE technology can be used with appropriate computer programs to provide load data as a result of measuring strain. This result can be described as Directly Applied Read and Transmit-Digital Load Cell (DART-DLC). To achieve load data, one must know the dimension of the strain gage elements 12 affixed to the surface, the elasticity of the strain gage elements 12, and the strain which is determined by the DSE.

Features of the DSE include that it can:

Detect crack initiation and monitors crack growth

Provide a unique identification signal for each gage from 0 to 4 billion, so gages can be serialized.

Be temperature compensated by using the microprocessor or external processor to calculate the change in the dimensions of the body surface to which the DSE is attached based on the thermal coefficient of expansion equation for the material from which the underlying body is made. This equation is stored in the local microprocessor or the remote processor. The temperature of the material at any time a strain signal is received is input to the local microprocessor or the remote processor (as appropriate), manually by a user (through an input device of the computer 70) or automatically from a temperature sensing means such as a thermocouple. The dimensional changes, if any, are used to account for temperature effects on the strain calculated by the local microprocessor or the remote processor.

Be configured to produce a strain rosette, a circular shape to measure radial strain, or any polygonal shape to measure strain Measure strain on the order of 5 microstrain Provide a signal indicating the change in the surface of the object with deformation of the surface The strain gage elements 12 can be configured in any geometric shape having a perimeter constructed of line segments, as described in U.S. application Ser. No. 12/311,052, filed Aug. 26, 2009, which is incorporated herein by reference in its entirety. The gages as described in U.S. application Ser. No. 12/311,052 are shaped, for example, as concentric circles, polygons, squares, etc., all with a blank interior and the gage constituting the boundary.

Referring now to FIGS. 10A and 10B, the strain gage elements 12 of the gage-emitter 10 can also be configured as a grid 12b of light and dark bands. The serialization elements (not shown) are configured as end-to-end bars as illustrated in FIG. 1B. A waveguide 16 (shown in greater detail in FIG. 10C) carries light from a light source 18 to a position below the grid 12b (shown in plan view in FIG. 10B). In the view shown in FIG. 10C, the waveguide 16 is 10 mil polymethyl methacrylate ("PMMA") and] the grid 12b is formed as a first sheet S1 of Mylar over the waveguide 16, and a second sheet S2 of Mylar is provided below the grid 12b to act as a window.

The dark bands of the grid 12b block light, while the light band transmits light. A sensor-receiver 20 above the grid 12b observes the dark bands and the light transmitted by the light bands. The bands are displaced from an original configuration as the surface to which the DSE is attached is displaced due to an applied force. The displacement observed by the image sensing device is used to measure strain.

Figure 11A:
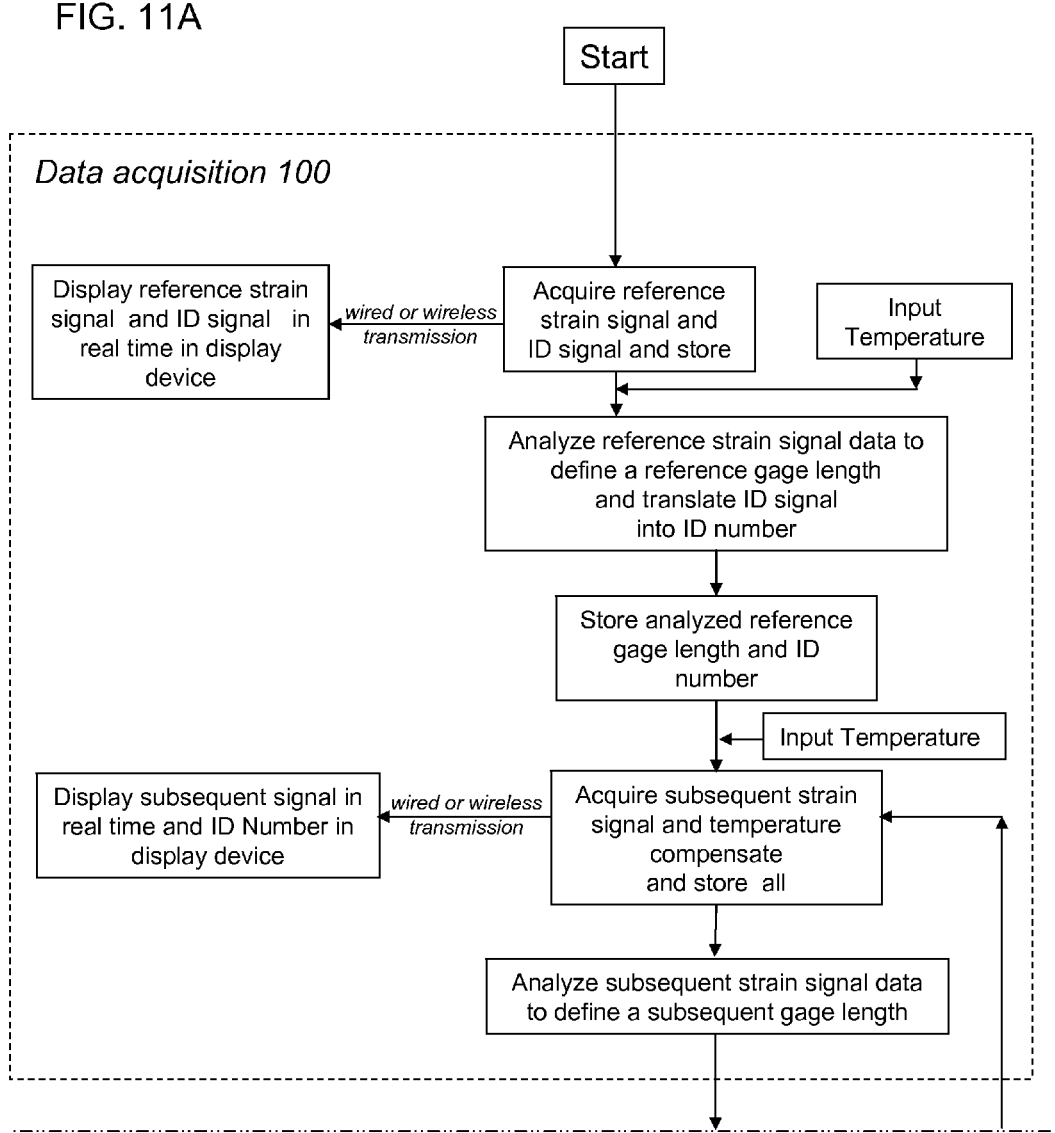

Referring now to FIGS. 11A and 11B together, there is shown a high level flow diagram illustrating the algorithm followed by the computer programs in accordance with the present invention. The algorithm comprises three basic stages, signal acquisition 100, strain analysis 200, and data logging 300; and utilizes two types of signals, a reference signal, acquired by the sensor-receiver 20 from the strain gage elements 12, either without application of a load or with a reference load on the object for which strain is to be measured, and subsequent signals, acquired by the sensor-receiver 20 from the strain gage elements 12 after the reference signal, in the presence of a load or change to the load on the object.

The signal acquisition stage comprises the following steps: The sensor-receiver 20 acquires the reference signal and unique identification number signal from the strain gage elements 12 and the serialization elements 14, respectively, and outputs data representing the reference signal to the local microprocessor 60 or the remote processor 74 (as appropriate). Any time a strain signal is acquired by the processor, the temperature of the material is input to the local microprocessor 60 or the remote processor 74 (as appropriate). A program or programs implemented by the local microprocessor 60 or the remote processor 74 then analyzes the reference signal data to define a reference gage length (which in the case of a grid 12b, is a gage length for each side of the grid 12b) and concurrently displays or may display the reference signal, preferably in real time, on a computer monitor or other display device 76. A program or programs implemented by the computer 70 also analyzes the unique identification number signal to translate the signal into a number and concurrently displays or may display the number, preferably in real time on a computer monitor or display device 76 to correlate the gage with the reference and subsequent signals. Following the analysis step, the computer 70 stores the analyzed reference signal data with the corresponding unique identification number, in the data base.

Once the reference signal has been acquired, analyzed, and stored, the sensor-receiver 20 acquires a subsequent signal from the strain gage elements 12 and outputs data representing that subsequent signal (that is, the current subsequent signal) to the computer 70 with the corresponding unique identification number.

Acquisition of subsequent signals can take place either continuously or at predetermined intervals, or it can be triggered by an external event such as the application of a load. The number of subsequent signals thus can range from one to thousands. Once data representing a subsequent signal (other than the signal representing the unique identification number, which has been acquired and translated into the unique identification number at the initiation of the process) is input to the local microprocessor 60 or the remote processor 74, the program analyzes it to define a subsequent gage length (or gage lengths, in the case of a grid 12b) and concurrently displays the corresponding subsequent signal, preferably in real time, on a computer monitor or other display device 76 (preferably on the same monitor or other display device on which the reference signal is being displayed, to facilitate comparison). Following the analysis step, the computer 70 stores the analyzed subsequent signal data for the current subsequent signal, with the corresponding unique identification number.

The strain analysis stage for the uniquely identified DSE takes place following the signal grabbing stage, and is carried out each time a subsequent strain signal is acquired. In the strain analysis stage, the computer 70 calculates the linear or rosette strain from the stored reference signal data and the stored subsequent signal data for the current subsequent signal, based on the changes in the gage length (or gage lengths) (that is, the change between the reference gage length and the subsequent gage length) as a function of time and change in the load. Thus, a new linear or rosette strain calculation is made for each subsequent signal. The strain calculation for the uniquely identified DSE can then be utilized as a display, as well as providing information on fatigue damage or strain hysteresis for materials of known and unknown mechanical properties, providing advance notice of an approaching failure point for materials of known mechanical properties, extrapolating a failure point for a material of unknown mechanical properties, or based on collected damage accumulation data.

The data logging stage takes place following each iteration of the strain analysis stage. In the data logging stage, the program gets the current results and writes them to a log file for the uniquely identified DSE.

As will be appreciated by those of skill in the art, the flow diagram of FIGS. 11A and 11B is for purposes of illustration, and some changes can be made in the algorithm without affecting the results. For example, the display of the reference and subsequent signals for the uniquely identified DSE can take place sequentially with the analysis of those signals, as well as substantially concurrently; the acquisition and display of the reference signal and the unique identification signal and/or the subsequent signals can be initiated by an external event; and signals for the uniquely identified DSE can be recorded during an event and stored for processing at a later time.

Other Implementation Details

1. Terms

The detailed description contained herein is represented partly in terms of processes and symbolic representations of operations by a conventional computer. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure.

A "data packet" is a type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

2. Hardware

It should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems with hard-wired logic or programs stored in nonvolatile memory, such as read only memory.

3. Program

In the preferred embodiment, some of the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

No particular programming language has been required for carrying out the various procedures described above because it is considered that the operations, steps, and procedures described above and illustrated in the accompanying drawings are sufficiently disclosed to permit one of ordinary skill in the art to practice the present invention.

Moreover, there are many computers, computer languages, and operating systems which may be used in practicing the present invention and therefore no detailed computer program could be provided which would be applicable to all of these many different systems. Each user of a particular computer will be aware of the language and tools which are most useful for that user's needs and purposes.

The invention thus can be implemented by programmers of ordinary skill in the art without undue experimentation after understanding the description herein.

4. Product

Portions of the present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

5. Components

The major components (also interchangeably called aspects, subsystems, modules, functions, services) of the system and method of the invention, and examples of advantages they provide, are described herein with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A digital strain encoder comprising:
a gage-emitter including a plurality of active strain gage elements, the gage-emitter being affixable to a surface of a body to be measured and deformable on a one-to-one basis with the surface, wherein the strain gage elements emit a reference strain signal in the absence of strain and an altered strain signal when the surface is subjected to strain and the gage-emitter is deformed;
a sensor-receiver including a plurality of active strain sensor elements, the sensor-receiver floating over the gage-emitter so as not to deform with the surface, the strain sensor elements detecting the reference and altered strain signals emitted by the strain gage elements;
a transmitter for transmitting the detected reference and altered strain signals to a remote receiver; and
a self-contained energy source for powering at least the strain sensor elements and the transmitter.

2. The digital strain encoder of claim 1, wherein:
the gage-emitter further includes a plurality of active serialization elements for emitting a unique identification signal;
the sensor-receiver further includes serialization sensor elements for detecting the unique identification signal;
the transmitter also transmits the detected identification signal to the remote receiver, and the energy source also powers the serialization sensor elements.

3. The digital strain encoder of claim 1, wherein the strain gage elements are independent of each other.

4. The digital strain encoder of claim 1, wherein the strain gage elements are equally spaced, side-by-side bars and the serialization elements are end-to-end, unequally spaced bars, and wherein the lengths of the serialization elements and the spacing between the serialization elements encode an identification number unique to the gage-emitter.

5. The digital strain encoder of claim 1, further comprising a local microprocessor for processing signals detected by the strain sensor elements and the serialization sensor elements.

6. The digital strain encoder of claim 2, further comprising:
a temperature sensor for sensing the temperature of the surface and
processing means for processing signals detected by the strain sensor elements and the serialization sensor elements, and for calculating the change in the dimensions of the surface based on the thermal coefficient of expansion equation for the body.

7. The digital strain encoder of claim 1, wherein the strain gage elements are configured as a grid of light and dark bands, and wherein the digital strain encoder further comprises means for carrying light from a light source to a position below the grid.

8. Apparatus for measuring strain on a surface, comprising:
the digital strain encoder of claim 1;
a remote receiver for receiving the strain signal transmitted by the transmitter;
a computer database for storing the strain signal received by the remote receiver as data; and
processing means for calculating strain based on the reference strain signal and the altered strain signal.

9. Apparatus of claim 8, wherein the processing means is a microprocessor included in the digital strain encoder.

10. Apparatus of claim 8, wherein the processing means is a processor is remote from the digital strain encoder.

11. Apparatus of claim 8, wherein the processing means comprises a local microprocessor included in the digital strain encoder and a remote processor remote from the digital strain encoder.

12. Apparatus of claim 8, wherein the strain gage elements are arranged linearly and the processing means senses strain directly by measuring the relative displacement of the strain gage elements when the surface and the gage-emitter are deformed.

13. Apparatus of claim 8, wherein the strain gage elements are arranged radially around a common center and detect anomalies and structural health monitoring precursors around the circumference of stress concentration areas, regardless of direction.

14. A method of calculating strain, using the apparatus of claim 6, comprising the steps of:
acquiring a reference strain signal and a unique identification number signal from the strain gage elements and the serialization elements, respectively;
in conjunction with the step of acquiring a reference strain signal and a unique identification number signal, inputting the temperature of the surface to the processing means;
outputting data representing the reference strain signal to the processing means;
analyzing the reference strain signal data to define a reference gage length of the strain gage elements, analyzing the unique identification number signal to translate the unique identification number signal into a number, and performing a temperature compensation for the analyzed reference strain signal data based on the input temperature of the surface and the thermal coefficient of expansion equation for the surface, using the processing means;
acquiring a subsequent strain signal from the strain gage elements;
in conjunction with the step of acquiring a subsequent strain signal, inputting the temperature of the surface to the processing means;

outputting the unique identification number and data representing the subsequent strain signal to the processor means;

analyzing the subsequent strain signal data to define a subsequent gage length of the strain gage elements, and performing a temperature compensation for the analyzed subsequent strain signal data based on the input temperature of the surface and the thermal coefficient of expansion equation for the surface, using the processing means; and calculating a linear strain or rosette strain from the temperature-compensated, analyzed reference strain signal data and the temperature-compensated, analyzed subsequent strain signal data, based on the difference between the reference gage length and the subsequent the gage length as a function of time and change in the load.

* * * * *